Sept. 11, 1923.
A. LA PLANT
BABY CARRIAGE ATTACHMENT
Filed Sept. 10, 1921
1,467,811
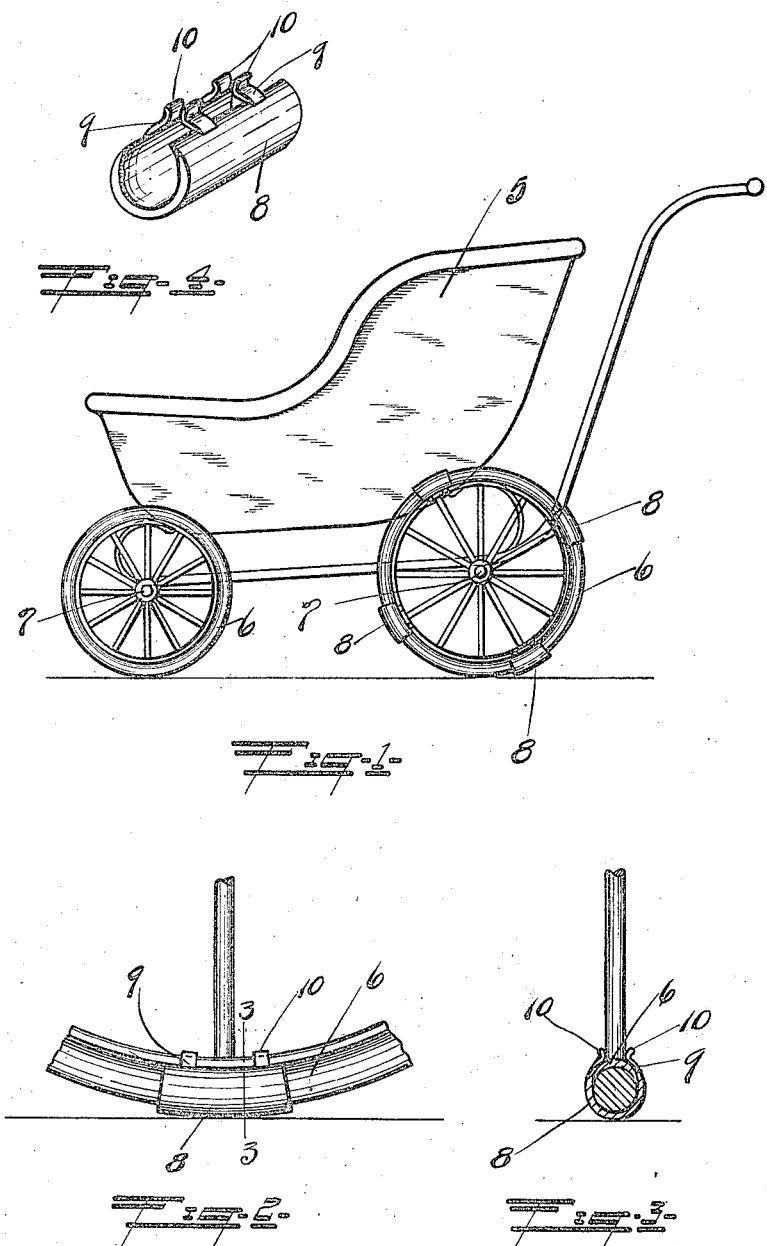
INVENTOR.
Albert LaPlant.
BY
Frank C. Fearman
ATTORNEY.

Patented Sept. 11, 1923.

1,467,811

UNITED STATES PATENT OFFICE.

ALBERT LA PLANT, OF BAY CITY, MICHIGAN.

BABY-CARRIAGE ATTACHMENT.

Application filed September 10, 1921. Serial No. 499,777.

*To all whom it may concern:*

Be it known that I, ALBERT LA PLANT, a citizen of the United States of America, and a resident of Bay City, in the county of Bay and State of Michigan, have invented certain new and useful Improvements in Baby-Carriage Attachments, of which the following is a specification.

This invention relates to certain new and useful improvements in attachments for baby carriages, and more particularly to an attachment which can be detachably secured to the rim of the baby carriage wheels in spaced relation to each other, and having for an object the sharp distortion of the regular outer circumference of the wheel, and which as the wheel is revolved will sharply flex the springs of the baby carriage in a manner similar to the result obtained when the body is forced down by an attendant and then allowed to spring back to original position.

One object of the invention is to provide a simple and inexpensive attachment which can be attached to the baby carriage wheels for agitating the body of the carriage.

Another object of the invention is to provide an attachment which can be very quickly and easily applied and removed.

With the above and other objects in view, the present invention consists in the combination and arrangement of parts hereinafter more fully described, illustrated in the accompanying drawings, and particularly pointed out in the appended claim, it being understood that changes may be made in the form, size, proportion and minor details of construction without departing from the spirit or sacrificing any of the advantages of the invention.

In the drawing:—

Fig. 1 is a side view of a baby carriage, illustrating my attachment secured to one of the wheels thereof.

Fig. 2 is an enlarged fragmentary detailed view of a portion of the wheel showing the attachment in place.

Fig. 3 is a section taken on the line 3—3 of Fig. 2.

Fig. 4 is an isometric view of the attachment.

Referring now to the drawing in which I have shown the preferred embodiment of my invention, I have indicated the baby carriage by the numeral 5, this is supported on the ground engaging wheels 6 which are revoluably mounted on the usual axles 7, these are all of the conventional type and form no part of the present invention.

A preferably resilient member 8 is detachably secured to the rim of the wheel 6, the inner surface being formed to fit and embrace the outer surface of the wheel and tire and is formed similar to a short section of air automobile tire casings. Metal clips 9 are moulded in the member 8 in spaced relation, the free ends 10 thereof converging and then being bent outwardly so that when it is desired to apply the attachment to the wheels the members 9 will spring over the rim and tire of the wheels and will be held in proper position thereon, and when removing the attachment it is merely necessary to pull it free from the wheel. While I have shown and described a pair of resilient spring members as the means for securing the attachment in place, it will be readily understood that a pair of buckles and straps, or other means of securing can be used without departing from the spirit of the invention.

The tread of the attachment can be formed of rubber or any other suitable material and the member applied to the wheel will be governed by the diameter thereof, and it will be obvious that as the wheels revolve they will sharply raise and drop as the attachments come into contact with the ground, this will flex the baby carriage springs, and cause the body to spring up and down similar to the movement occasioned by the attendant forceably pressing down and then quickly releasing the body as is customary when soothing and quieting a baby who is irritated and crying.

From the foregoing description it will be obvious that I have perfected a simple and inexpensive attachment for baby carriages, which will automatically cause the springs to flex as the carriage is pushed backward or forward.

What I claim is:—

An attachment for baby carriages comprising a relatively short cylindrical member formed of resilient material and having a pair of resilient metal clips moulded therein, the ends of said clips being flared to facilitate detachable engagement with the wheels of the baby carriage.

In testimony whereof, I affix my signature.

ALBERT LA PLANT.